United States Patent
Jones (10) Patent No.: US 10,702,066 B2
(45) Date of Patent: Jul. 7, 2020

(54) OFFICE CHAIR

(71) Applicant: Profim SP. ZO.O, Turek (PL)

(72) Inventor: Mark Jones, Chorley (GB)

(73) Assignee: PROFIM SP. ZO.O, Turek (PL)

( * ) Notice: Subject to any disclaimer, the term of this patent is extended or adjusted under 35 U.S.C. 154(b) by 0 days.

(21) Appl. No.: 16/194,518

(22) Filed: Nov. 19, 2018

(65) Prior Publication Data

US 2020/0154889 A1    May 21, 2020

(51) Int. Cl.
*A47C 1/032* (2006.01)
*F16C 11/06* (2006.01)
*A47C 7/34* (2006.01)

(52) U.S. Cl.
CPC ...... *A47C 1/03272* (2013.01); *A47C 1/03255* (2013.01); *A47C 7/34* (2013.01); *F16C 11/06* (2013.01)

(58) Field of Classification Search
CPC ........... A47C 1/03272; A47C 1/03255; A47C 1/03261; A47C 1/032; A47C 1/031; A47C 7/34; F16C 11/06
USPC ................................ 297/300.5, 300.2, 300.1
See application file for complete search history.

(56) References Cited

U.S. PATENT DOCUMENTS

| | | | | |
|---|---|---|---|---|
| 3,253,858 A * | 5/1966 | Degen | ...................... | A47C 3/18 297/328 |
| 7,806,478 B1 * | 10/2010 | Cvek | .................. | A47C 1/03255 297/300.1 |
| 7,837,265 B2 * | 11/2010 | Machael | ................. | A47C 1/023 297/300.2 |
| 2003/0230918 A1 * | 12/2003 | Serber | ..................... | A47C 1/022 297/313 |
| 2005/0146185 A1 * | 7/2005 | Fookes | .............. | A47C 1/03255 297/300.4 |
| 2005/0168030 A1 * | 8/2005 | Bykov | .................. | A47C 3/0252 297/312 |
| 2012/0256458 A1 * | 10/2012 | Gehner | ..................... | A47C 7/14 297/314 |
| 2013/0169016 A1 * | 7/2013 | Meyuhas | ............... | A47C 9/002 297/313 |
| 2014/0239686 A1 * | 8/2014 | Christianson | .......... | A47C 1/023 297/301.1 |
| 2015/0245713 A1 * | 9/2015 | Desanta | .................. | A47C 1/032 297/316 |
| 2015/0282620 A1 * | 10/2015 | Bock | .................. | A47C 1/03211 297/342 |
| 2016/0374879 A1 * | 12/2016 | Christian | ................. | A61G 5/14 297/313 |
| 2018/0184809 A1 * | 7/2018 | Bock | .................. | A47C 1/03261 |
| 2018/0213939 A1 * | 8/2018 | Schmidt | ................... | A47C 7/44 |

* cited by examiner

*Primary Examiner* — Mark R Wendell (57) ABSTRACT

An office chair comprises a seat element (3) mounted movably on a fixed support element (1) and a back support element (2). The arrangement simultaneously allows the seat element (3) to move and tilt backwards when the user leans backwards. The seat element (3) carries the chair seating panel (4) in such a way that when the user leans to a side, said chair seating panel (4) tilts to the same side according to the user's movement and independently of the chair's back element (2).

8 Claims, 7 Drawing Sheets

OFFICE CHAIR

BACKGROUND OF THE INVENTION

This invention relates to a chair, specifically to an office chair, comprising a support panel for a seat element and a substantially vertical back support element. The present office chair allows the user to influence and adjust his or her seating dynamic to varying degrees.

In contrast to a rigid chair, where there is no provision for changing the relative positions of seat to backrest, the office chair has provision for adjusting those relative positions according to the requirements of the user.

The mechanisms provided in an office chair serve to encourage the user into a dynamic sitting behavior. This entails changing his or her position regularly, thus avoiding muscular discomforts such as cramp or fatigue and, thus, allowing the user to sit for longer periods without experiencing the normal problems associated with prolonged sitting, or, at least, substantially reducing those effects.

Well known mechanisms for adjusting seating positions on office chairs allow for the tilting of the backrest, the seat panel, or even a combination of both.

An example of such a chair mechanism is know from EP2725943 A1 (L & P Property Mgt) which discloses an office chair which accommodates some of the user's movements and whose seat panel tilts and moves backwards when the user leans backwards thus tilting the backrest.

To improve this situation a side-to-side/left-to-right motion can be added which promotes movement even further.

More recent improvements allow for the sideways rocking or "twisting" of the seat and chair. Such an arrangement is known from the German "Offenlegungsschrift" DE102014006058 (Grupo Forma) which discloses an office chair wherein the seat panel and the backrest can twist sideways thus allowing the user to rock sideways.

However, the Groupo Forma disclosure involves a rigid connection between the seat panel and the backrest such that the seat and the backrest have to move together. Such an arrangement has been shown not to be favored by many users.

A good office chair seating solution benefits the chair users by providing motion. This ensures that the chair users are not static for long periods of time as this is bad for the chair users' health.

One instance of where this movement is limited is for example if the chair user movement is limited to forwards & backwards then they drop something & suddenly reach for it. After being static for a long period sudden movement can lead to back injury.

The present invention discloses an office chair which alleviates the above problems and disadvantages.

An independent seat & back twist allows for user preference. The front connection is a ball joint located in the center plane of the seat. This ball joint is formed from two half spheres forming a complementary shaped housing enclosing the ball.

The upper half of the housing is fixed directly to the lower panel of the chair seat panel the lower part is assembled by means of bolt which reaches through the ball of the joint. This arrangement essentially creates a 360 degree pivot around the centre point of the ball joint.

The ball is mounted on the top surface of the seat element and the housing surrounding the ball is mounted under the chair seating panel, thus allowing the former to lean sideways when the user leans sideways.

The rear of the seat is essentially floating on two compression springs spaced evenly away from the central plane (these could be any spring type, rubber, leaf spring etc.). These compression springs may rest in spring pockets lodged in the seat element into which pockets the compression springs may recede when coil springs are used.

The resulting motion is best described as a rolling motion where the tilting motion is strongest at the rear of the chair seating panel and reduces in amplitude the nearer it gets to the front of that panel. A useful locking option may be to include a means for the user to lock the twisting motion, hence precluding any sideways twisting of the chair seating panel when it is not wanted.

Since it is preferable to have chair controls at the front of the seat, for easy manipulation by the user, such a locking option should be operable at the front or the front side of the chair seating panel. To guard any fingers probing in the area of the ball joint, the top panel of the seat element is turned downwards to effectively shield the moving parts of the front joint.

This locking option may be realized by putting a sliding block either side of the ball joint which sliding blocks can be moved toward the center of the seat panel or away from it, thus either increasing or reducing the effective space between the underside of the chair seating panel and the seat element.

At the rear of the seat, as it is essentially floating, two items may be added: guides to align the seat left to right. These may be profiled to shape the twist to the desired shape, i.e. conical surfaces may be added, if the twist were desired to be exactly conical.

Tilt limiters either side of the central point of the seat element are required to stop the seat from flipping over when leaning to the side. These tilt limiters may vary in form, they may be screws/bolts, wires or even integrated hook features, the latter of which are the preferred realization or embodiment. Straps could also be used at the front of the seat if required for strength purposes.

SUMMARY OF THE INVENTION

An office chair comprising a seat element mounted movably on a fixed support element and a back support element, which arrangement simultaneously allows the seat element to move and tilt backwards when the user leans backwards and which seat element carries the chair seating panel in such a way that when the user leans to a side, said chair seating panel tilts to the same side according to the user's movement and independently of said chair's back element.

An office chair comprising a seat element mounted movably on a fixed support element and a back support element, which arrangement simultaneously allows the seat element to move and tilt backwards when the user leans backwards and which seat element carries the chair seating panel in such a way that when the user leans to a side, said chair seating panel tilts to the same side according to the user's movement and independently of said chair's back element.

The sideways tilting mechanism may comprise a ball joint at the front of said chair seating panel and may comprise spring means such as two springs at the rear.

The ball joint at the front of the seat element may consist of a ball mounted in a housing comprising two half spheres fixed to said chair seating panel.

The ball joint may sit in the housing whose inside is shaped to match said ball and wherein said ball joint forms a 360 degrees pivot around its centre.

The two springs are compression springs on which the rear of the chair seating panel rests.

Each of said springs may rest in a retaining pocket which retaining pockets are set into said seat element spaced equally on either side of the centre of said seat element.

Types of suitable spring include coil, leaf or rubber springs.

The maximum tilt of said chair seating panel may be determined by a pair of tilt limiters connecting the underside of said chair seating panel with said seat element and positioned equidistant outboard from said springs.

Each of said tilt limiters may comprise two hooks which engage with each other in such a way that the tilt of the said seating panel is limited by said hooks touching.

DETAILED DESCRIPTION OF A PREFERRED EMBODIMENT

Figure 1:
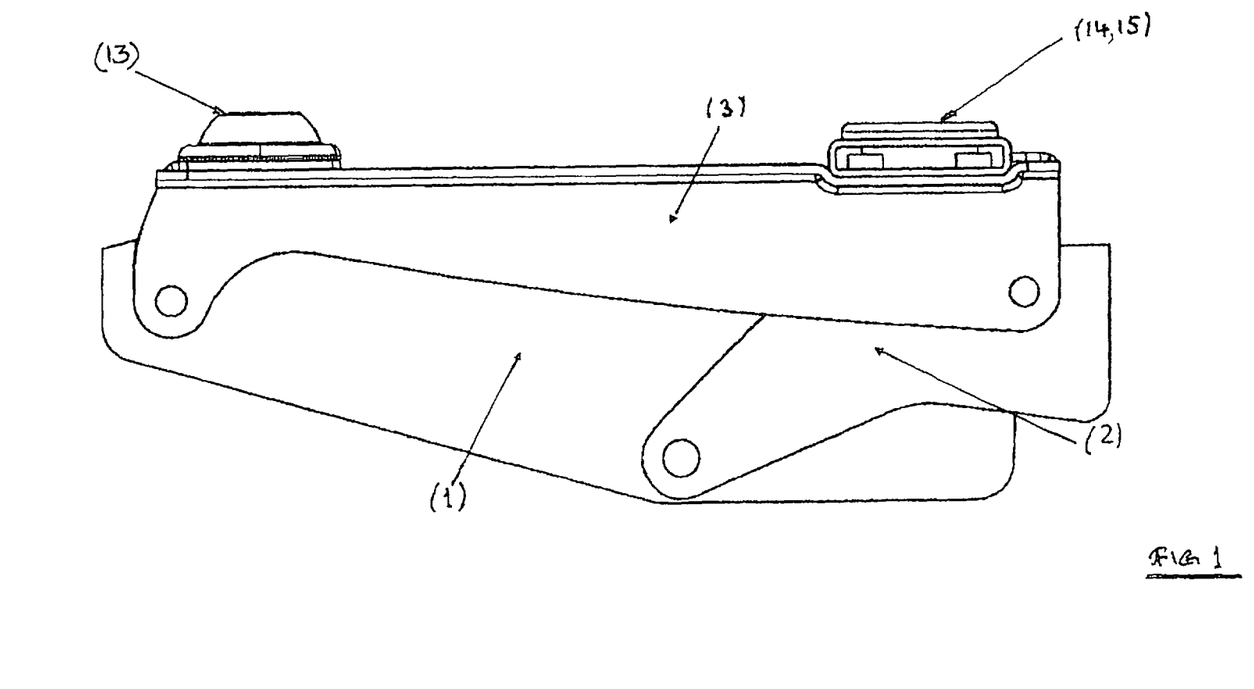
FIG. 1 shows a side view of the seat support structure without the chair seating panel.

FIG. 1 shows the basic support structure of the chair. The seat element (3) which carries the chair seating panel (4) is supported by a fixed element (1) to which a back element (2) is hinged and said seat element (3) is hinged at its front to the fixed element (1) and at its rear to the back element (2).

This basic arrangement enables the chair to be rocked backwards and apart from the back rest declining when the user leans back, the seat panel moves backwards and its rear end also tilts downwards. This gives the user a pleasant and relaxing position.

This figure also shows the front support for the chair seating panel (4) in the shape of a ball joint (13) and the rear support in the shape of two spring assemblies (14, 15) on which the rear end of the chair seating panel (4) floats, one of which is shown.

Figure 2:
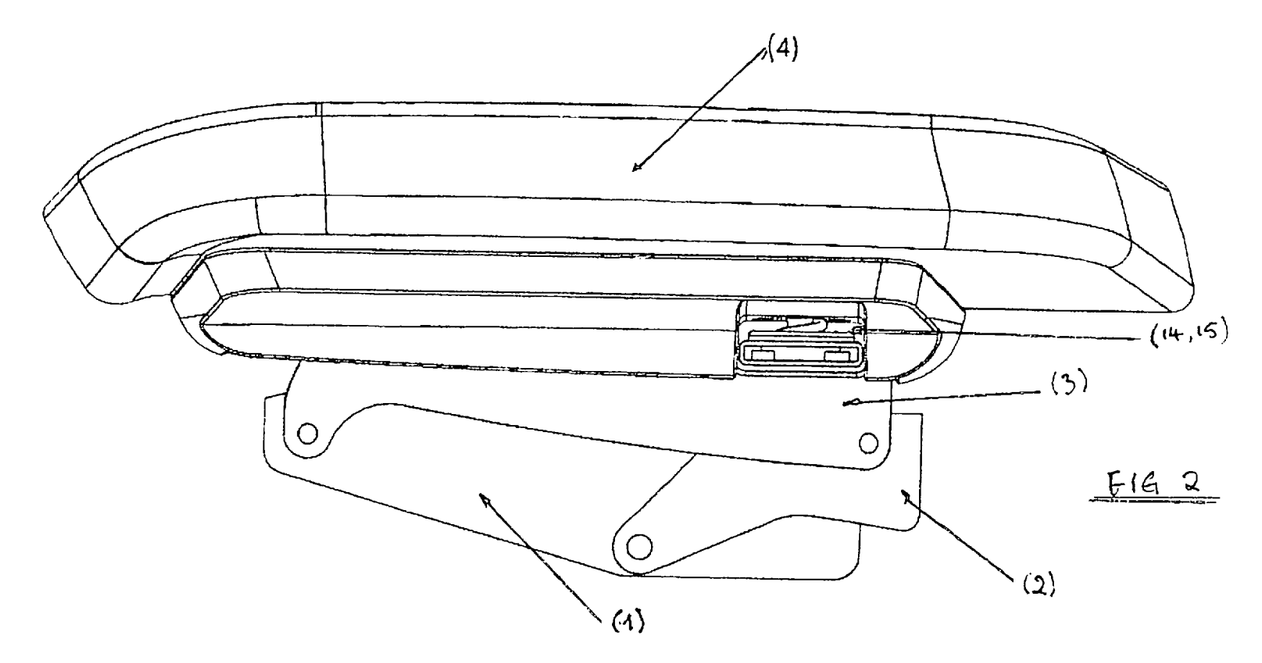
FIG. 2 shows a side view of the chair seating panel in place on the support structure.

FIG. 2 shows an elevation view with the chair seating panel (4) in place and illustrating in cut out view, one of the rear seat panel spring assemblies (14, 15) on which it floats.

Figure 3:
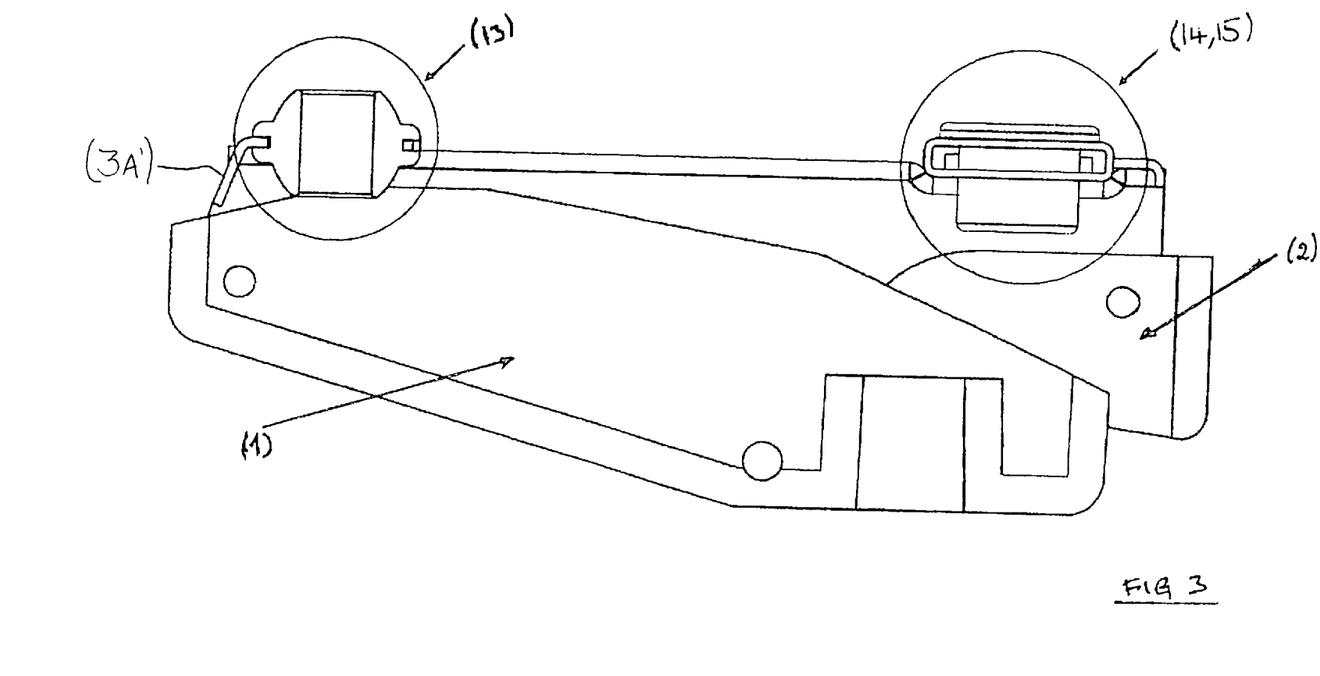
FIG. 3 shows a cross-sectional side view of the seat support structure with the front ball joint without the housing and one of the rear spring assemblies.

FIG. 3 shows side elevation view through the center of the seat element (3). (partially in section) with the forward ball joint partially assembled (13) and one of the rear spring assemblies (14, 15)

This figure also shows the front end 3A' of the top panel (3A) to the seat element (3), which is pointed downwards as a safe-guard against fingers being trapped in the ball joint assembly immediately behind it, when manipulating an adjustment mechanism, which is located at the front of the chair seat.

Figure 4:
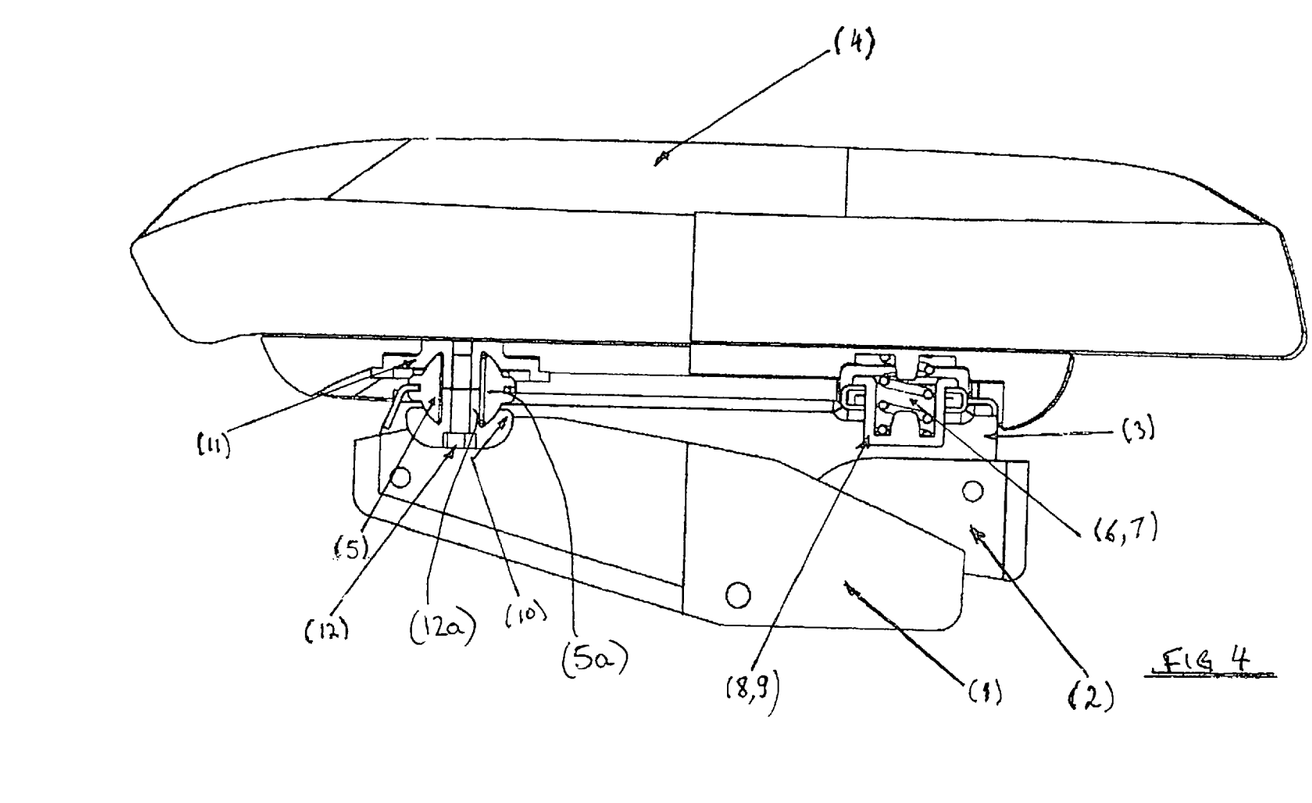
FIG. 4 shows similar view as FIG. 3, with the seating panel in place and showing details of the front ball joint assembly as well as one rear spring assembly.

FIG. 4 shows the basic construction of the chair with the chair seat element (4) in place. Illustrated are the two halves of the front ball joint housing (10, 1) held together by a sturdy bolt (12) and joining the complete housing (10, 11) to the bottom of the chair seat panel (4A) and at the same time holding the ball member (5) of the joint securely in place.

The rear support assemblies (14, 15) (one shown) are here in the form of coil springs (6, 7) which rest in pockets (8, 9).

Figure 5:
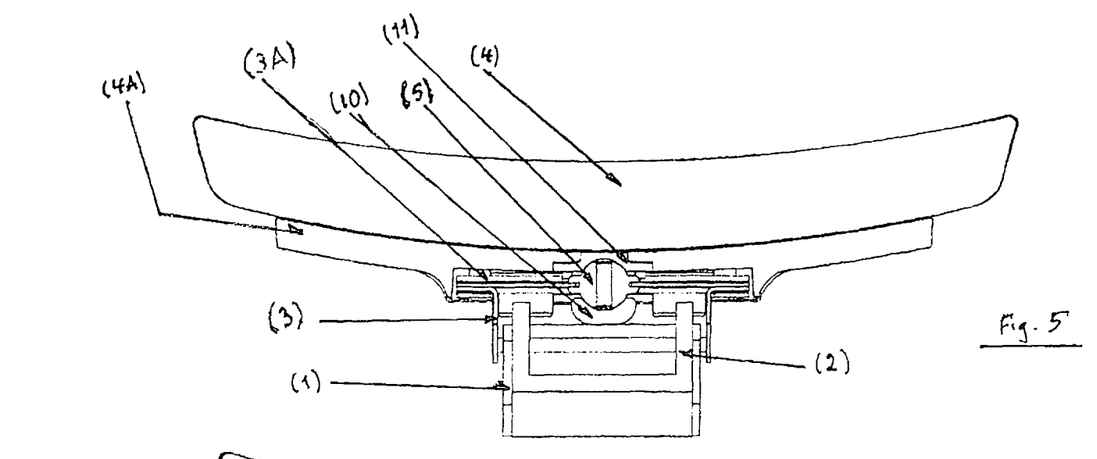
FIG. 5 and FIG. 6 show a front view of the chair highlighting the front ball joint with the seat in horizontal position (FIG. 5) and in tilted position (FIG. 6).

FIG. 5 shows a cross-sectional view of the unstressed position of the front ball joint (13) with the seat in a horizontal position. It shows the ball member (5) of the ball joint fixed to the top panel (3A) of the seat element surrounded by the assembled halves of the ball housing (10, 11), which in turn, is attached to the lower panel (4A) of the chair seat panel.

Figure 6:
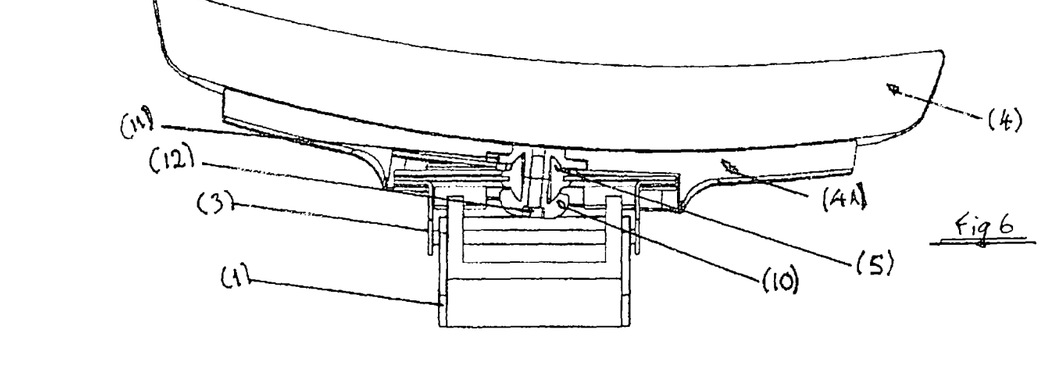

FIG. 6 shows the chair seat panel (4) tilted to one side and the front ball joint rotating its housing. In this figure it can be seen that the hole (5a) in ball member (5) is larger in diameter than the diameter of the tubular connection piece (12a) providing a guide for bolt (12), the bolt holding the two halves (10, 11) of the housing together.

The play, thus created, is sufficient to allow the housing (10, 11) to rotate a certain amount in relation to ball (5).

Figures 7, 8:
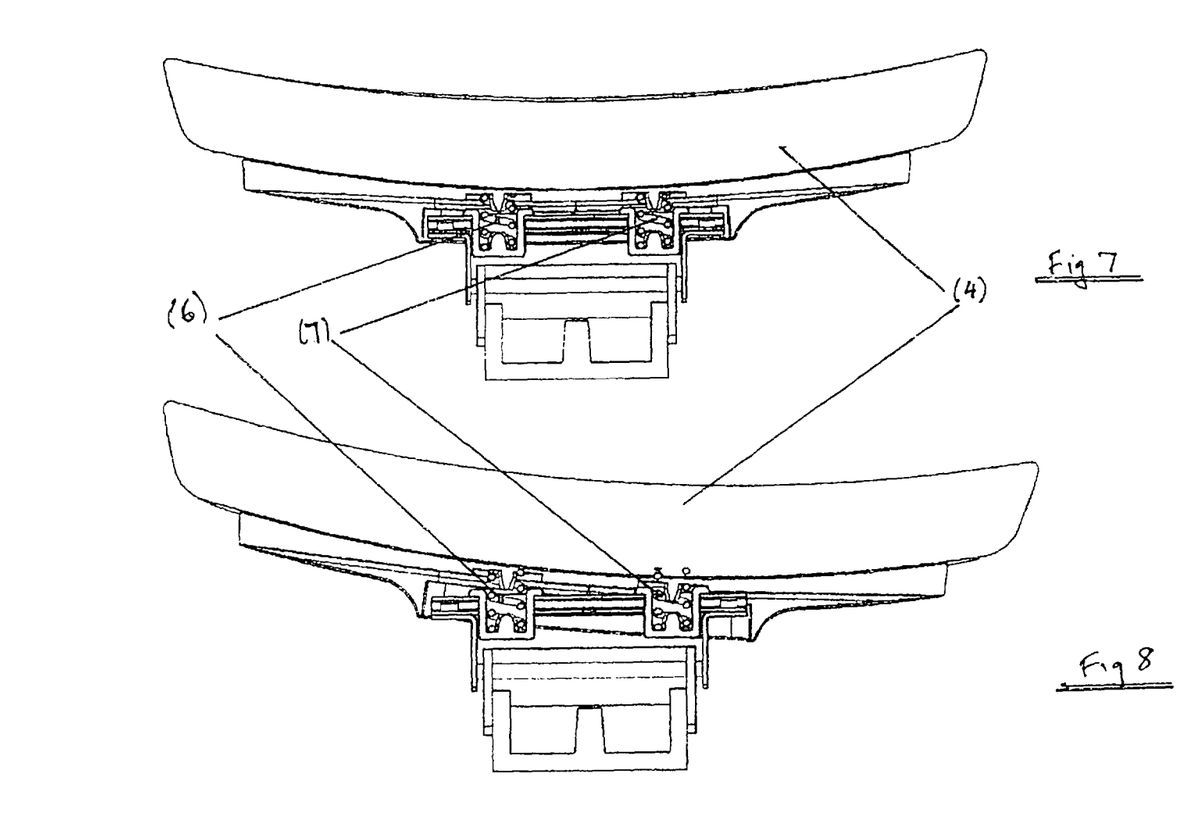
FIG. 7 and FIG. 8 show a rear cross-sectional view of the chair through both spring assemblies, with the springs relaxed in horizontal seat position (FIG. 7) and in sideways tilt (FIG. 8).

FIG. 7 shows the rear springs in rest position with the chair seat element (4) horizontal.

FIG. 8 shows said chair seat element (4) leaning sideways and hence one of the springs (6, 7) being compressed and the other being stretched.

Figure 9:
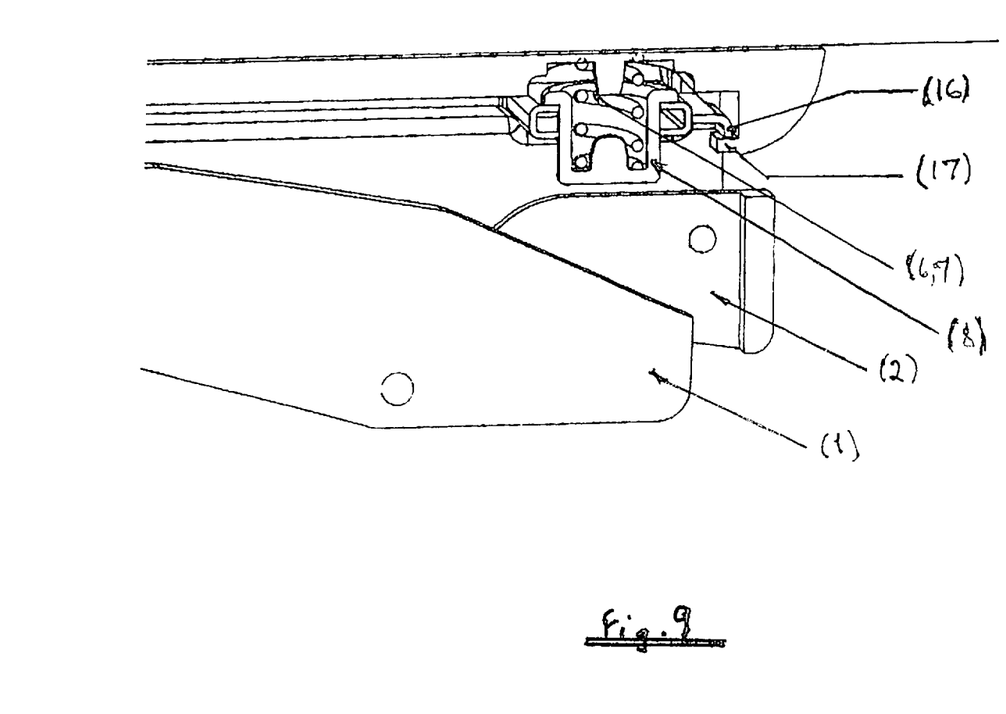
FIG. 9 shows a preferred realization or embodiment of one of the rear tilt limiters as hooks, formed into the lower panel of the chair seat panel engaging with a finger on the rear of the seat element

FIG. 9 shows a preferred realization or embodiment of the tilt limiters between the chair seating panel (4) and the seat element (3). These limiters comprise a hook (16) depending from the chair seating panel (4) and engaging a second hook (17) attached to the seat element limiting the amount of tilt by physical contact of said two hooks at the point of maximum tilt, thus acting as a stop when the seat panel is tilted to the opposite side.

These limiters could also be in the form of straps connecting the chair seating panel with the seat element or loops which pass through holes in lower panel of the chair seating panel and whose loose ends are fixed to the seat element.

While it is acknowledged the drawings only represent one particular realization or embodiment of the invention, it is stressed that they are in no way limiting on possible variations on those realizations or embodiments such as different springs at the back and different arrangements for the ball joint at the front of the chair seating panel.

The invention claimed is:

1. An office chair comprising: a seat element movably mounted on a fixed support element and a back support element, wherein the arrangement simultaneously allows the seat element to move and tilt backwards when a user leans backwards and wherein the seat element carries a chair seating panel in such a way that when the user leans to a side, said chair seating panel tilts to the same side according to the user's movement and independently of said chair's back element wherein said sideways tilting mechanism comprises a ball joint at a front of said chair seating panel and two springs at a rear.

2. The office chair according to claim 1, wherein said ball joint at the front of the seat element consists of a ball mounted in a housing comprising two half spheres fixed to said chair seating panel.

3. The office chair according to claim 2, wherein said ball joint sits in the housing whose inside is shaped to match said ball and wherein said ball joint forms a 360 degrees pivot around its centre.

4. The office chair according to claim 1, wherein said two springs are compression springs on which the rear of the chair seating panel rests.

5. The office chair according to claim 4, wherein each of said springs rest in a retaining pocket wherein said retaining pockets are set into said seat element and spaced equally on either side of the centre of said seat element.

6. The office chair according to claim 1, wherein said springs are selected from the group comprising: coil, leaf and rubber springs.

7. The office chair according to claim 1, wherein maximum tilt of said chair seating panel is determined by a pair of tilt limiters connecting an underside of said chair seating panel with said seat element and positioned equidistant outboard from said springs.

8. The office chair according to claim 7, wherein each of said tilt limiters comprises two hooks which engage with each other in such a way that the tilt of said seating panel is limited by said hooks touching.

\* \* \* \* \*